US012130623B2

United States Patent
Shmueli et al.

(10) Patent No.: US 12,130,623 B2
(45) Date of Patent: Oct. 29, 2024

(54) ADVANCED MOVEMENT THROUGH VEGETATION WITH AN AUTONOMOUS VEHICLE

(71) Applicant: Blue White Robotics Ltd, Tel Aviv (IL)

(72) Inventors: Aviram Shmueli, Modi'in (IL); Alon Ascher, Tel Aviv (IL); Ben Alfi, Tel Aviv (IL); Shmuel Ur, Shorashim (IL)

(73) Assignee: Blue White Robotics Ltd, Tel Aviv (IL)

( * ) Notice: Subject to any disclaimer, the term of this patent is extended or adjusted under 35 U.S.C. 154(b) by 264 days.

(21) Appl. No.: 17/372,626

(22) Filed: Jul. 12, 2021

(65) Prior Publication Data

US 2023/0011864 A1    Jan. 12, 2023

(51) Int. Cl.
*G05D 1/00*    (2024.01)
*A01B 69/00*    (2006.01)
(Continued)

(52) U.S. Cl.
CPC ......... *G05D 1/0088* (2013.01); *A01B 69/001* (2013.01); *A01B 69/008* (2013.01);
(Continued)

(58) Field of Classification Search
CPC ......... G05D 1/0088; G05D 2201/0201; G05D 1/0246; A01B 69/001; A01B 69/008; B60W 30/085; B60W 60/0011; B60W 60/0025; B60W 2300/152; B60W 2420/42; G06Q 30/0283; G06N 20/00
See application file for complete search history.

(56) References Cited

U.S. PATENT DOCUMENTS 7,822,266 B2    10/2010  Wellington et al.
2010/0063648 A1*    3/2010  Anderson ............ G05D 1/0088
                                                701/1

(Continued)

FOREIGN PATENT DOCUMENTS

FR    3056550 A1 *    3/2018    ............. A01D 46/30

OTHER PUBLICATIONS

Machine Translation of FR3056550A1 (Year: 2018).*

*Primary Examiner* — Anne Marie Antonucci
*Assistant Examiner* — Jordan T Smith

(57) ABSTRACT

Disclosed here are methods and systems for automatically operating automated vehicles moving through vegetation obstacles with minimal damage, comprising receiving image (s) depicting vegetation obstacle(s) blocking at least partially a path of an automated vehicle executing a mission, analyzing the image(s) to extract one or more obstacle attributes of the vegetation obstacle(s), computing a plurality of movement patterns for operating the automated to cross the vegetation obstacle(s) based on one or more vehicle attributes of the automated vehicle with respect to one or more of the obstacle attributes where each movement pattern defines one or more movement parameters of the automated vehicle, selecting one of the movement patterns estimated to reduce a cost of damage to the automated vehicle and/or to the one or more vegetation obstacles, and outputting instructions for operating the automated vehicle to move through the vegetation obstacle(s) according to the selected movement pattern.

17 Claims, 4 Drawing Sheets

(51) Int. Cl.
  *A01B 69/04* (2006.01)
  *B60W 60/00* (2020.01)
  *B64C 39/02* (2023.01)
  *G06N 20/00* (2019.01)
  *G06Q 30/0283* (2023.01)
  *B64U 101/00* (2023.01)

(52) U.S. Cl.
  CPC .... *B60W 60/0011* (2020.02); *B60W 60/0025* (2020.02); *B64C 39/024* (2013.01); *G06N 20/00* (2019.01); *G06Q 30/0283* (2013.01); *B60W 2300/152* (2013.01); *B60W 2420/403* (2013.01); *B64U 2101/00* (2023.01); *B64U 2201/10* (2023.01)

(56) References Cited

U.S. PATENT DOCUMENTS

| | | | | |
|---|---|---|---|---|
| 2016/0297430 | A1* | 10/2016 | Jones | B60W 50/14 |
| 2018/0325012 | A1* | 11/2018 | Ferrari | A01B 69/008 |
| 2019/0073912 | A1* | 3/2019 | Mellinger, III | G06V 20/17 |
| 2019/0143964 | A1* | 5/2019 | Zuckerman | B60W 60/001 701/23 |
| 2019/0297778 | A1* | 10/2019 | George | A01D 45/26 |
| 2020/0079362 | A1* | 3/2020 | Kingman | B60R 19/483 |
| 2020/0331464 | A1* | 10/2020 | Lacaze | G08G 1/22 |
| 2021/0192234 | A1* | 6/2021 | Chen | B60W 60/001 |
| 2022/0126870 | A1* | 4/2022 | Shi | B60W 10/18 |
| 2022/0266862 | A1* | 8/2022 | Bybee | B60W 10/184 |

* cited by examiner

ADVANCED MOVEMENT THROUGH VEGETATION WITH AN AUTONOMOUS VEHICLE

FIELD AND BACKGROUND OF THE INVENTION

The present invention, in some embodiments thereof, relates to automatically operating automated vehicles to cross vegetation obstacles, and, more specifically, but not exclusively, to automatically operating automated vehicles to move through vegetation obstacles while suffering and/or inflicting minimal damage.

The use of automated vehicles either remotely controlled, partially-automated and/or autonomous vehicles is rapidly increasing in a plurality of market segments for a plurality of missions and applications ranging from commercial applications to military applications as well as other government level applications.

As demonstrated and proved in numerous use cases and applications, the use of automated vehicles may significantly reduce manual labor, cost while significantly increasing productivity, efficiency, quality and more.

One major example for effective use of automated vehicles are agricultural related mission and applications where automated vehicles typically coupled with appropriate payloads are deployed and operated for a plurality of operations over vast geographical areas which in case of manually operated vehicles as traditionally used may consume massive resources.

SUMMARY OF THE INVENTION

It is an object of the present invention to provide, methods, systems and software program products for automatically operating automated vehicles to cross vegetation obstacles by moving through the vegetation obstacle while inflicting minimal damage. The foregoing and other objects are achieved by the features of the independent claims. Further implementation forms are apparent from the dependent claims, the description and the figures.

According to a first aspect of the present invention there is provided a method of automatically operating automated vehicles moving through vegetation obstacles with minimal damage, comprising using one or more processors for:
- Receiving one or more images depicting one or more vegetation obstacles blocking at least partially a path of an automated vehicle executing a mission.
- Analyzing the one or more images to extract one or more of a plurality of obstacle attributes of the one or more vegetation obstacles.
- Computing a plurality of movement patterns for operating the automated to cross the one or more vegetation obstacles based on one or more of a plurality of vehicle attributes of the automated vehicle with respect to one or more of the plurality of obstacle attributes. Each of the plurality of movement patterns defines one or more of a plurality of movement parameters of the automated vehicle.
- Selecting one of the plurality of movement patterns estimated to reduce a cost of damage to the automated vehicle and/or to the one or more vegetation obstacles.
- Outputting instructions for operating the automated vehicle to move through the one or more vegetation obstacles according to the selected movement pattern.

According to a first aspect of the present invention there is provided a system for automatically operating automated vehicles moving through vegetation obstacles with minimal damage, comprising one or more processors configured to execute a code. The code comprising:
- Code instructions to receive one or more images depicting one or more vegetation obstacles blocking at least partially a path of an automated vehicle executing a mission.
- Code instructions to analyze the one or more images to extract one or more of a plurality of obstacle attributes of the one or more vegetation obstacles.
- Code instructions to compute a plurality of movement patterns for operating the automated to cross the one or more vegetation obstacles based on one or more of a plurality of vehicle attributes of the automated vehicle with respect to one or more of the plurality of obstacle attributes. Each of the plurality of movement patterns defines one or more of a plurality of movement parameters of the automated vehicle.
- Code instructions to select one of the plurality of movement patterns estimated to reduce a cost of damage to the automated vehicle and/or to the one or more vegetation obstacles.
- Code instructions to output instructions for operating the automated vehicle to move through the one or more vegetation obstacles according to the selected movement pattern.

According to a third aspect of the present invention there is provided a computer program product for automatically operating automated vehicles moving through vegetation obstacles with minimal damage, comprising one or more computer readable storage medias having thereon:
- First program instructions executable by one or more processors to cause the one or more processors to receive one or more images depicting one or more vegetation obstacles blocking at least partially a path of an automated vehicle executing a mission.
- Second program instructions executable by the one or more processors to cause the one or more processors to analyze the one or more images to extract one or more of a plurality of obstacle attributes of the one or more vegetation obstacles.
- Third program instructions executable by the one or more processors to cause the one or more processors to compute a plurality of movement patterns for operating the automated to cross the one or more vegetation obstacles based on one or more of a plurality of vehicle attributes of the automated vehicle with respect to one or more of the plurality of obstacle attributes. Each of the plurality of movement patterns defines one or more of a plurality of movement parameters of the automated vehicle.
- Fourth program instructions executable by the one or more processors to cause the one or more processors to select one of the plurality of movement patterns estimated to reduce a cost of damage to the automated vehicle and/or to the one or more vegetation obstacles.
- Fifth program instructions executable by the one or more processors to cause the one or more processors to output instructions for operating the automated vehicle to move through the one or more vegetation obstacles according to the selected movement pattern.

In a further implementation form of the first, second and/or third aspects, the automated vehicle is a member of a group consisting of: a ground vehicle, an aerial vehicle, a naval vehicle and/or the like.

In a further implementation form of the first, second and/or third aspects, crossing the one or more vegetation obstacles comprises: bending at least part of the one or more vegetation obstacles, breaking at least part of the one or more vegetation obstacles, cutting at least part of the one or more vegetation obstacles and/or the like.

In a further implementation form of the first, second and/or third aspects, each of the plurality of obstacle attributes is a member of a group consisting of: a type, a size, a length, a width, a height, a weight, a flexibility, a position with respect to the path and/or the like.

In a further implementation form of the first, second and/or third aspects, each of the plurality of vehicle attributes is a member of a group consisting of: a vehicle type, a vehicle structure, a speed range, a maneuverability, a material of one or more parts of the automated vehicle, a location of one or more reinforced parts of the automated vehicle, a location of one or more vulnerable parts of the automated vehicle and/or the like.

In a further implementation form of the first, second and/or third aspects, each of the plurality of movement parameters is a member of a group consisting of: a movement direction, an approach path, an approach angle, a contact point, a vehicle orientation, a speed, an acceleration, an altitude and/or the like.

In an optional implementation form of the first, second and/or third aspects, one or more of the plurality of movement patterns includes using one or more mechanical elements of the automated vehicle to clear the one or more vegetation obstacle and/or part thereof. The one or more mechanical elements comprising one or more members of a group consisting of: a mechanical arm and a cutting element.

In a further implementation form of the first, second and/or third aspects, the mission comprises one or more agricultural operations and the one or more vegetation obstacles is formed by one or more crop producing plants.

In an optional implementation form of the first, second and/or third aspects, the cost of damage comprises a cost of damage to one or more other vehicles operated to cross the one or more vegetation obstacles following the automated vehicle.

In an optional implementation form of the first, second and/or third aspects, the cost of damage comprises a cost of recurring damage to one or more vehicles operated to cross the one or more vegetation obstacles multiple times during the mission.

In an optional implementation form of the first, second and/or third aspects, the cost of damage comprises a cost of recurring damage to one or more vehicles operated to cross the one or more vegetation obstacles in a plurality of future missions.

In an optional implementation form of the first, second and/or third aspects, the cost of damage is adjusted by:
Predicting a number and/or type of vehicles estimated to cross the one or more vegetation obstacles.
Adjusting the cost of damage according to one or more vehicle attributes of the vehicles predicted to cross the one or more vegetation obstacles.

In an optional implementation form of the first, second and/or third aspects, the cost of damage comprises a cost of long term damage to vegetation infrastructure of the one or more vegetation obstacles. The long term damage includes loss of future crop.

In a further implementation form of the first, second and/or third aspects, the cost of damage is computed using one or more trained Machine Learning (ML) models configured to:
Estimate a damage to the automated vehicle and/or to the one or more vegetation obstacles based on analysis of the one or more vehicle attributes of the automated vehicle with respect to the plurality of obstacle attributes.
Estimate a cost of the estimated damage.

In an optional implementation form of the first, second and/or third aspects, one or more of the plurality of movement parameters defined by the selected movement pattern are adjusted in real-time according to sensory data captured by one or more sensors deployed to monitor interaction between the automated vehicle and the one or more vegetation obstacles while the automated vehicle is operated to move through the one or more vegetation obstacles.

In an optional implementation form of the first, second and/or third aspects, one or more of the plurality of movement patterns are adjusted according to analysis of one or more additional images depicting one or more additional vegetation obstacles at least partially blocking the path of the automated vehicle further down the path beyond the one or more vegetation obstacles.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
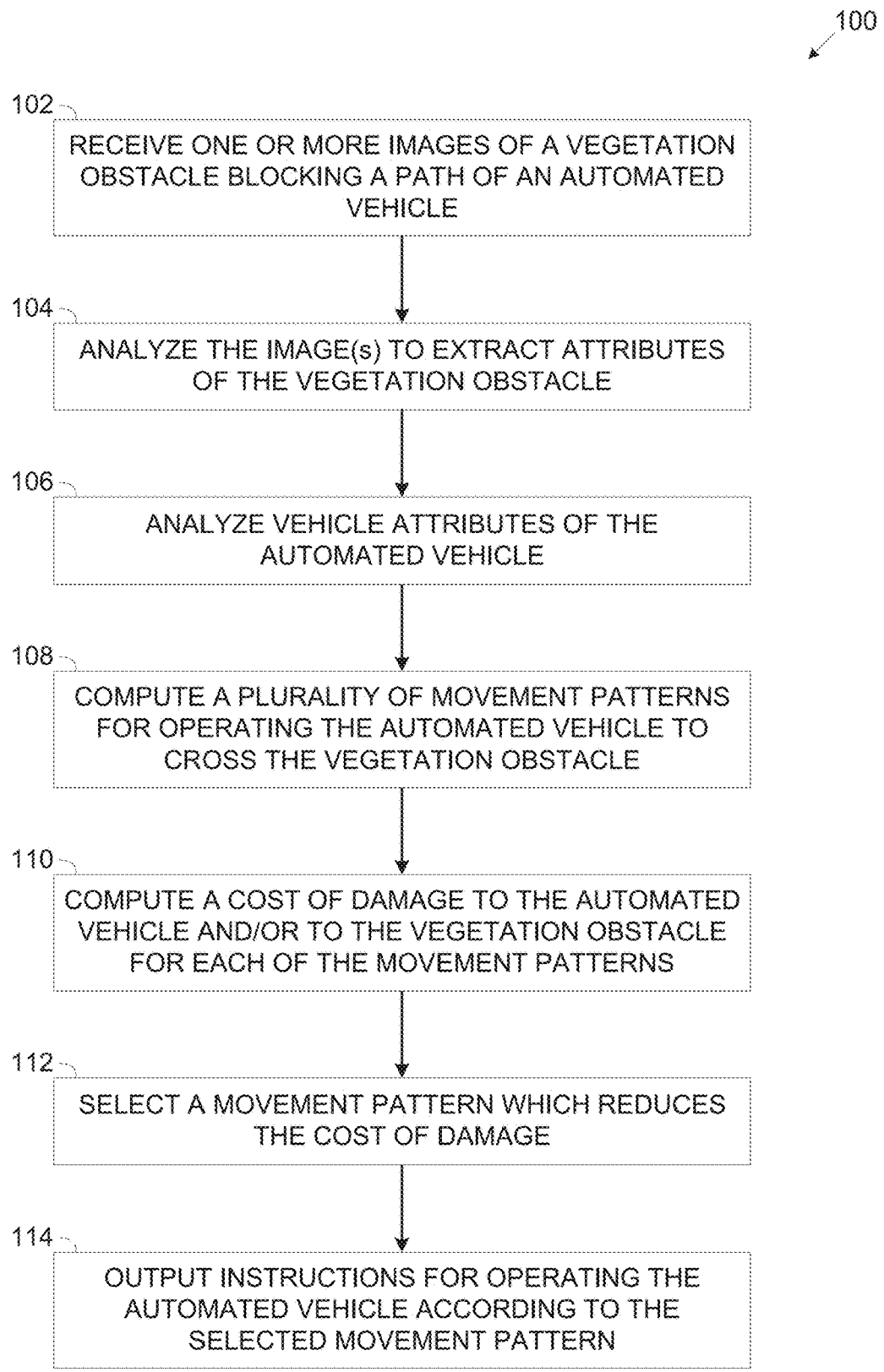
FIG. 1 is a flowchart of an exemplary process of automatically operating automated vehicles to move through vegetation obstacles with minimal damage, according to some embodiments of the present invention.

The present invention, in some embodiments thereof, relates to automatically operating automated vehicles to cross vegetation obstacles, and, more specifically, but not exclusively, to automatically operating automated vehicles to move through vegetation obstacles while suffering and/or inflicting minimal damage.

According to some embodiments of the present invention, there are provided methods, systems and computer program products for computing instructions for operating automated vehicles to cross vegetation obstacles, for example, a tree, a bush, a plant and/or the like blocking at least partially a path of the automated vehicles during a mission of the automated vehicle, for example, a data gathering mission, a material and/or equipment transfer mission, an agricultural related mission (e.g. spraying, picking, placing, etc.).

Specifically, the computed instructions are directed to operate the automated vehicles, for example, ground, aerial and/or naval vehicles which may be remotely controlled, at least partially automated and/or autonomous vehicles to go (move) through the vegetation obstacles rather than moving around them (bypassing) while inflicting minimal damage, measured by cost of damage, estimated for the automated vehicle and/or for the vegetation obstacles which may be formed by agricultural crop producing plants and/or part thereof.

While the instructions may be typically computed for operating automated vehicles, the instructions may be provided to a human driver manually operating a vehicle to cross the vegetation obstacle by moving through the vegetation obstacle.

Sensory data depicting the blocking vegetation obstacle, for example, image(s), thermal map(s), ranging map(s) and/or the like may be analyzed to identify, extract and/or estimate one or more obstacle attributes of the vegetation obstacle, for example, type of the vegetation obstacle, physical attributes of the vegetation obstacle (e.g. dimensions, weight, etc.), a rigidity/flexibility of the vegetation obstacle, a location, position, orientation, height, and/or the like of the vegetation obstacle with respect to the path of the automated vehicle and/or the like. The obstacle attributes may further include a value of the vegetation obstacle and/or part thereof, a value of crop e.g. fruit) and/or the like in particular in case the vegetation obstacle is a crop producing plant.

A plurality of movement patterns may be computed for the automated vehicle to move through the vegetation obstacle, for example, by bending, breaking and/or cutting at least part of the vegetation obstacle. The movement patterns may be computed based on one or more vehicle attributes of the automated vehicle, for example, type, structure, dimensions, speed range, maneuverability capabilities, material, vulnerable parts, reinforced parts, cutting and/or breaking capabilities and/or the like, in particular, with respect to the obstacle attributes identified and/or estimated for the vegetation obstacle. Each of the movement patterns may defines one or more movement parameters for operating the automated vehicle, for example, a path, an access point, a direction, an approach angle, a speed, an orientation of the automated vehicle and/or the like.

Since the instructions are computed for operating the automated vehicle to move through the vegetation obstacle, the automated vehicle itself may suffer damage and/or damage may be inflicted to the vegetation obstacle as result of contact, pressure, force and/or the like applied between the automated vehicle and the vegetation obstacle. Damage to the automated vehicle may include, for example, structural damage such as, for example, scratches, dents, bended parts, broken parts and/or the like. Damage to the vegetation obstacle may include, for example, broken branches, damage to the tree, bush and/or plant from which the blocking vegetation obstacle extends and/or the like, loss of crop (e.g. fruits, vegetables, herbs, flowers, etc.) growing on the vegetation obstacle and/or the like.

The damage, in particular, the cost of the damage to the automated vehicle and/or to the vegetation obstacle may be computed, estimated and/or predicted for each of the plurality of movement patterns, computed to operate the automated vehicle to cross the vegetation obstacle by moving through it.

In addition to the immediate damage which may result from the current crossing of the vegetation obstacle by the automated vehicle, the damage may further include recurring to the automated vehicle in case the automated vehicle is planned to cross the location of the vegetation obstacle multiple times in one or more of its future crossings through the vegetation obstacle, additional damage may be inflicted on the automated vehicle and/or the vegetation obstacle.

Moreover, the damage may also include additional damage to one or more other vehicles which may need to cross the vegetation obstacle following (i.e. after) the automated vehicle since these vehicles may suffer damage and/or may inflict damage to the vegetation obstacle.

Furthermore, the damage may include long term damage to the vegetation obstacle, specifically when formed by a crop producing plant since future crop may be lost due to the damage inflicted on the vegetation obstacle by the automated vehicle while moving through it.

The plurality of movement patterns may be therefore analyzed and evaluated to compute, estimate and/or determine a cost of the damage to the automated vehicle and/or to the vegetation obstacle which may include one or more of the cost of the immediate, the recurring, the additional and/or the long damage. Optionally weights may be assigned to one or more of the damage types, for example, the immediate damage, the long term damage, the recurring damage, the damage to the automated vehicle, the damage to other automated vehicles, the damage to the crop producing plant(s) and/or the like.

One of the plurality of movement pattern may be then selected for operating the automated vehicle to cross the vegetation obstacle, specifically the selected movement pattern is estimated to inflict minimal damage to the automated vehicle and/or to the vegetation obstacle and is thus estimated to reduce the cost of damage, for example, minimize the cost of damage compared to the cost of damage estimated for all other movement patterns.

Operating the automated vehicles to move through the vegetation obstacle in a movement pattern estimated to reduce the damage and hence the cost of damage may present major benefits and advantages compared to existing methods and system for operating automated vehicles to cross vegetation obstacles.

First, there may be many scenarios in which it may be impossible to operate the automated vehicle(s) to bypass (move around) the vegetation obstacle as may be done by the existing methods. For example, in some cases it may be simply impossible to move around the vegetation obstacle due to blocking object(s), no way around and/or the like. In another example, in many scenarios, taking a different path (detour) to bypass the vegetation obstacle to reach its other side may require a major detour which may significantly increase time, energy consumption and/or other resources consumption (e.g. manpower, maintenance, etc.) for completing the mission. In another example which may be highly applicable for agricultural mission, specifically in large agricultural areas where multiple vehicles may be operated simultaneously, operating the automated vehicle to bypass the vegetation vehicle may lead to blocking the path of another vehicle. In contrast, moving through the vegetation obstacle may prevent the automated vehicle from deviating, leaving and/or exiting its planned route thus significantly reducing time, cost and/or potential blocking of the path of other vehicles.

In addition, bypassing the vegetation obstacle as may be done by the existing methods may inflict additional penalties. For example, assuming the automated vehicle is operated to conduct one or more operations, for example, capture imagery data of a certain area, spray one or more materials in a certain agricultural area (e.g. field, orchard, etc.). In such case, bypassing the vegetation obstacle and deviating from the planned path may jeopardize the mission or at least reduce quality of the operation's outcome. For example, one or more bypassed areas may not be depicted in the captured imagery data or may be partially depicted or in low quality, from bad angles or long range. In another example, bypassing the vegetation obstacle may distance the automated vehicle from the sprayed target (trees, crop, etc.) which may reduce the spraying effectiveness and/or required increased amounts of the spraying material(s) which may be sprayed from longer distance with reduced accuracy.

Moreover, estimating the cost of the damage resulting from the automated vehicle moving through the vegetation obstacle may allow selecting one of the movement patterns which is predicted to involve least damage, which may be measured by the cost of damage meaning that the selected movement pattern may reduce (minimize) the cost of the damage thus reducing costs, repair effort, maintenance effort and/or the like.

Furthermore, computing the estimate cost of the damage to one or more other vehicles and/or to the vegetation obstacle in the short and/or long term as result of crossing events of the other vehicle(s) may allow for accurate planning and selection of movement patterns for the automated vehicle and/or for the other vehicles to further reduce the cost of the damage.

In addition, assigning weights to the different damage types may enable adapting the preferred movement pattern selection process to specific scenarios according to the type and value of automated vehicle(s) predicted to move through the vegetation obstacle, the type and value of the vegetation obstacle, specifically in case of agricultural crop producing plants and/or the like. Moreover, the weighted values may be learned by one or more machine learning models, for example, a neural network which may learn, evolve and/or adapt according to real-life and/or simulated scenarios of automated vehicles crossing through vegetation obstacles and the resulting damage.

Also, as stated herein before while the instructions may be typically computed for operating automated vehicles according to the selected movement pattern, the instructions and/or the movement pattern may be optionally provided to a human driver manually operating a vehicle. The movement patterns computed automatically and the movement pattern estimated automatically to reduce cost of damage may be highly more accurate and/or reliable compared to the driving decisions made by the human driver to move through the vegetation obstacle. Instructing the driver on how to move through the vegetation obstacle may therefore significantly reduce the cost of damage even for vehicles which are manually operated.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of automatically operating automated vehicles to move through vegetation obstacles with minimal damage, according to some embodiments of the present invention.

An exemplary process 100 may be executed to compute automatically instructions for operating automated vehicles to cross vegetation obstacles blocking a path of the automated vehicles by moving through the vegetation obstacle. Specifically, the instructions are computed for operating the automated vehicles to move through the vegetation obstacles rather than moving around (bypassing) the vegetation obstacle while inflicting minimal damage to the automated vehicle and/or to the vegetation obstacles which may be part of agricultural crop producing plants.

Images of the blocking vegetation obstacle may be analyzed to identify one or more obstacle attributes of the vegetation obstacle relating to the type and/or physical attributes of the vegetation obstacle as well as obstacle attributes describing and/or indicative of how the vegetation obstacle blocks the path of the automated vehicle.

A plurality of movement patterns may be then computed for operating the automated vehicle to move through the vegetation obstacle by analyzing vehicle attributes of the automated vehicle with respect to the identified obstacle attributes. Each of the movement patterns may defines one or more movement parameters for operating the automated vehicle, for example, a path, an access point, a direction, an approach angle, a speed, an orientation of the automated vehicle and/or the like.

The plurality of movement patterns may be further analyzed and evaluated to identify and select movement pattern which is estimated to inflict minimal damage either to the automated vehicle and/or to the vegetation obstacle.

Instructions may be then computed for operating the automated vehicle according to the selected movement pattern.

Figure 2:
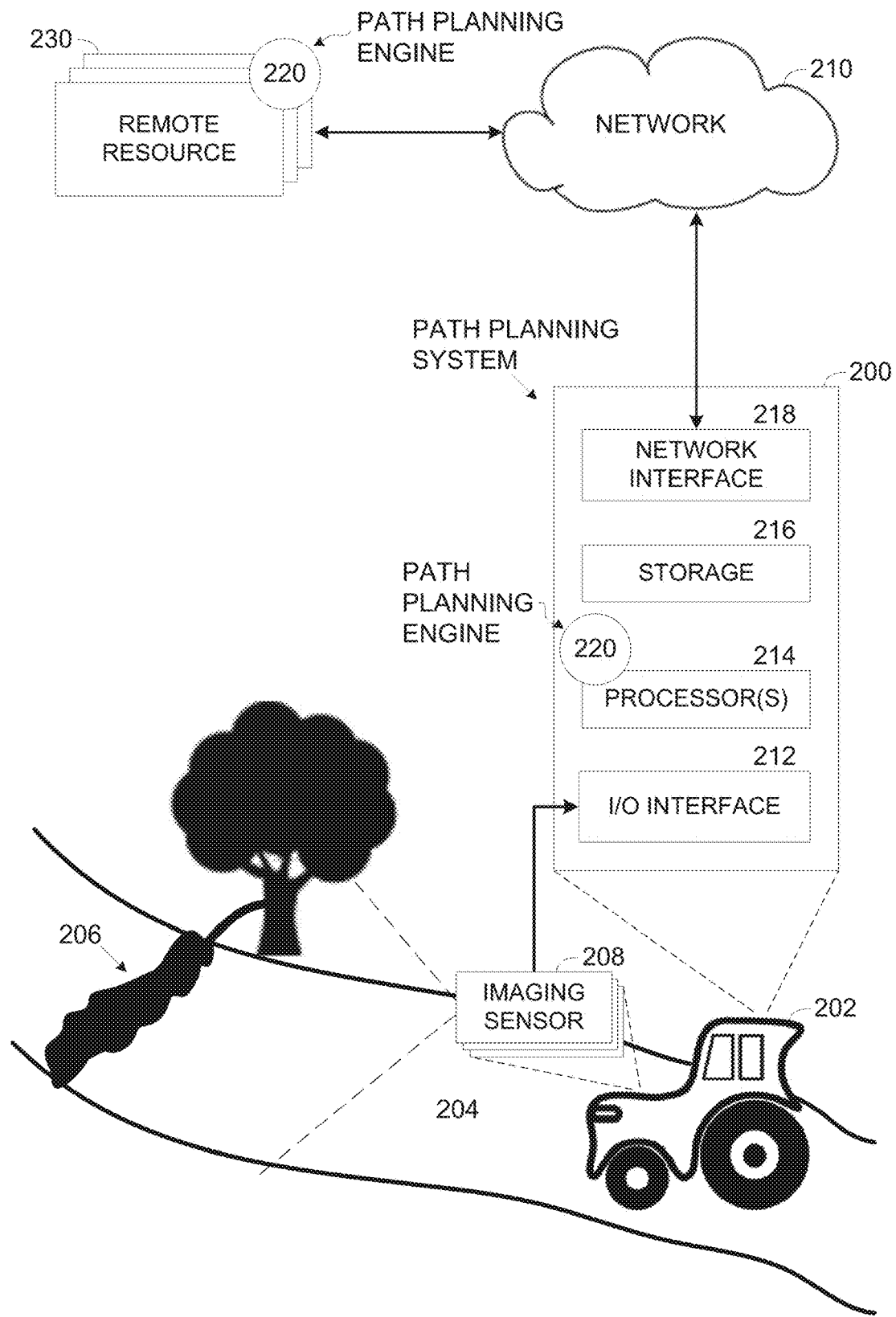
FIG. 2 is a schematic illustration of an exemplary system for automatically operating automated vehicles to move through vegetation obstacles with minimal damage, according to some embodiments of the present invention.

Reference is also made to FIG. 2, which is a schematic illustration of an exemplary system for automatically operating automated vehicles to move through vegetation obstacles with minimal damage, according to some embodiments of the present invention.

An exemplary path planning system 200, for example, a computer, a controller, a computing node and/or any processing device may be deployed in an automated vehicle 202 to execute the process 100 for computing instructions for operating the automated vehicle 202 to cross one or more vegetation obstacles, in particular, by moving through the vegetation obstacle(s) rather than bypassing it.

The automated vehicles 202, for example, an aerial vehicle (e.g. drone, etc.), a ground vehicle (e.g. tractor, robot, truck, combine, machine, etc.), a naval vehicle (e.g. boat, hovercraft. etc.) and/or the like may include automated vehicles of various levels, for example, remotely controlled vehicles, at least partially automated vehicles, autonomous vehicles and/or the like.

The automated vehicle 202 may be operated to execute one or more mission in one or more geographical areas and/or locations, in particular such areas where a path 204 of the automate vehicle 202 may be blocked, or partially blocked, by one or more vegetation obstacles 206. Naturally, in case the automated vehicle 202 is a ground vehicle, the path 204 may be a ground (land) path, for example, a path, a trail, a road, and/or the like. However, in case the automated vehicle 202 is an aerial vehicle and/or a naval vehicle, the path 204 may be an imaginary path through the air and/or water respectively in which the automated vehicle 202 is moving.

For example, a certain automate vehicle 202, for example, a ground vehicle and/or an aerial vehicle, may be move through a wooded area comprising trees, for example, a forest, a woodland, a grove and/or the like during a mission, for example gathering (collecting) data (e.g. imagery data, sensory data, soil samples, vegetation samples, etc.), cross the certain area to reach another area and/or the like. While moving through the wooded area, the automated vehicle 202 may encounter one or more branches of one or more of the trees which may block at least partially the path 204.

In another example, the automate vehicle 202, for example, a ground agricultural vehicle and/or platform (e.g. tractor, a robot, an automated pick and/or place machine, etc.) may execute an agricultural related mission, for example, gather data, conduct one or more agricultural operations (e.g. spray, pick, place, sow, transfer, etc.) in one or more agricultural areas, for example, a field, an orchard, a garden, a vineyard, a livestock grazing area (pasture) and/or the like. While moving through the agricultural area, the automated vehicle 202 may encounter one or more vegetation obstacles formed by one or more crop producing plants, for example, a tree, a bush, a crop and/or the like.

Figure 3A:
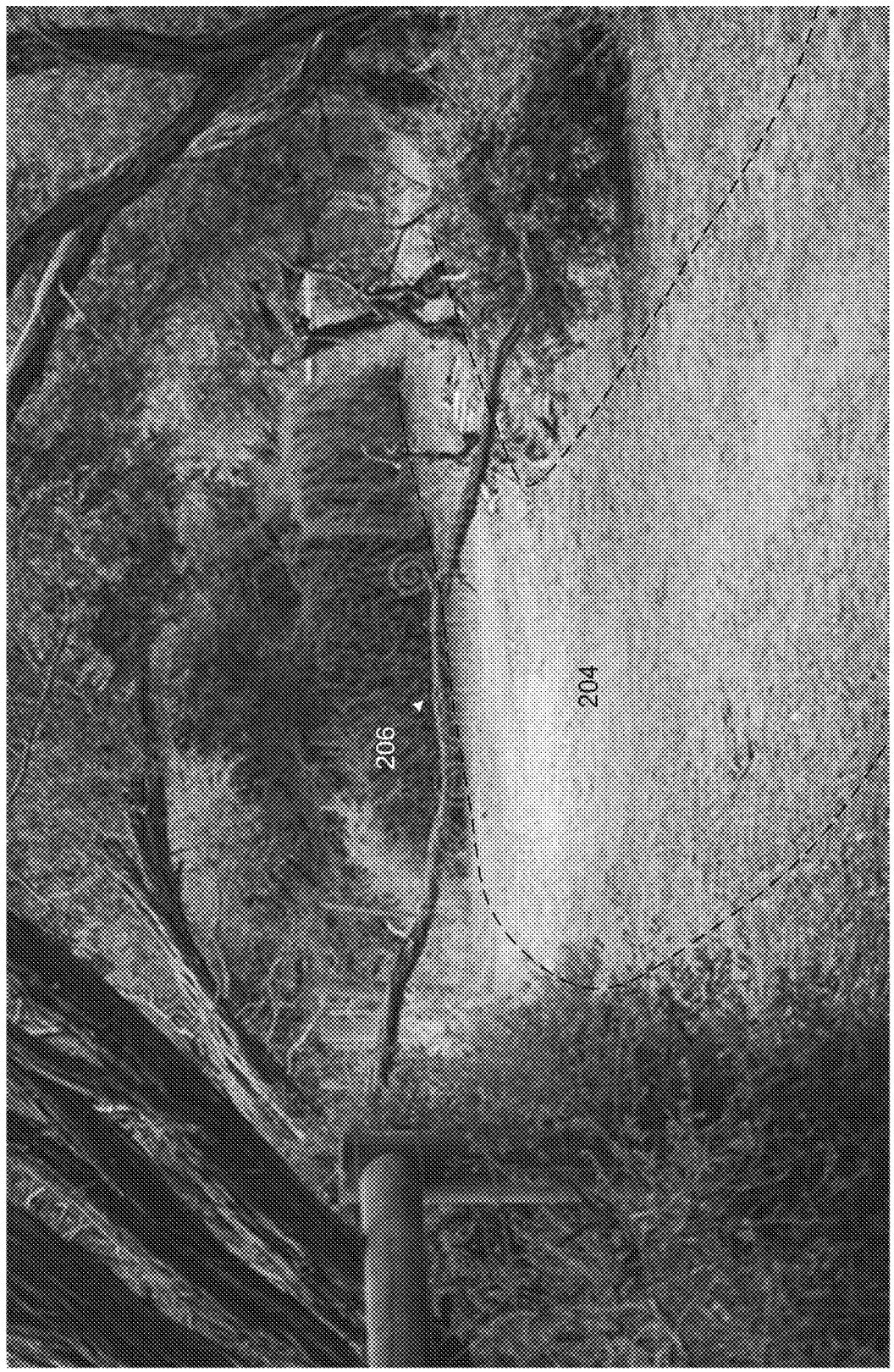
FIG. 3A and FIG. 3B, which are schematic illustrations of exemplary vegetation obstacles blocking a path of an automated vehicle operated to move through the vegetation obstacles with minimal damage, according to some embodiments of the present invention.
Figure 3B:
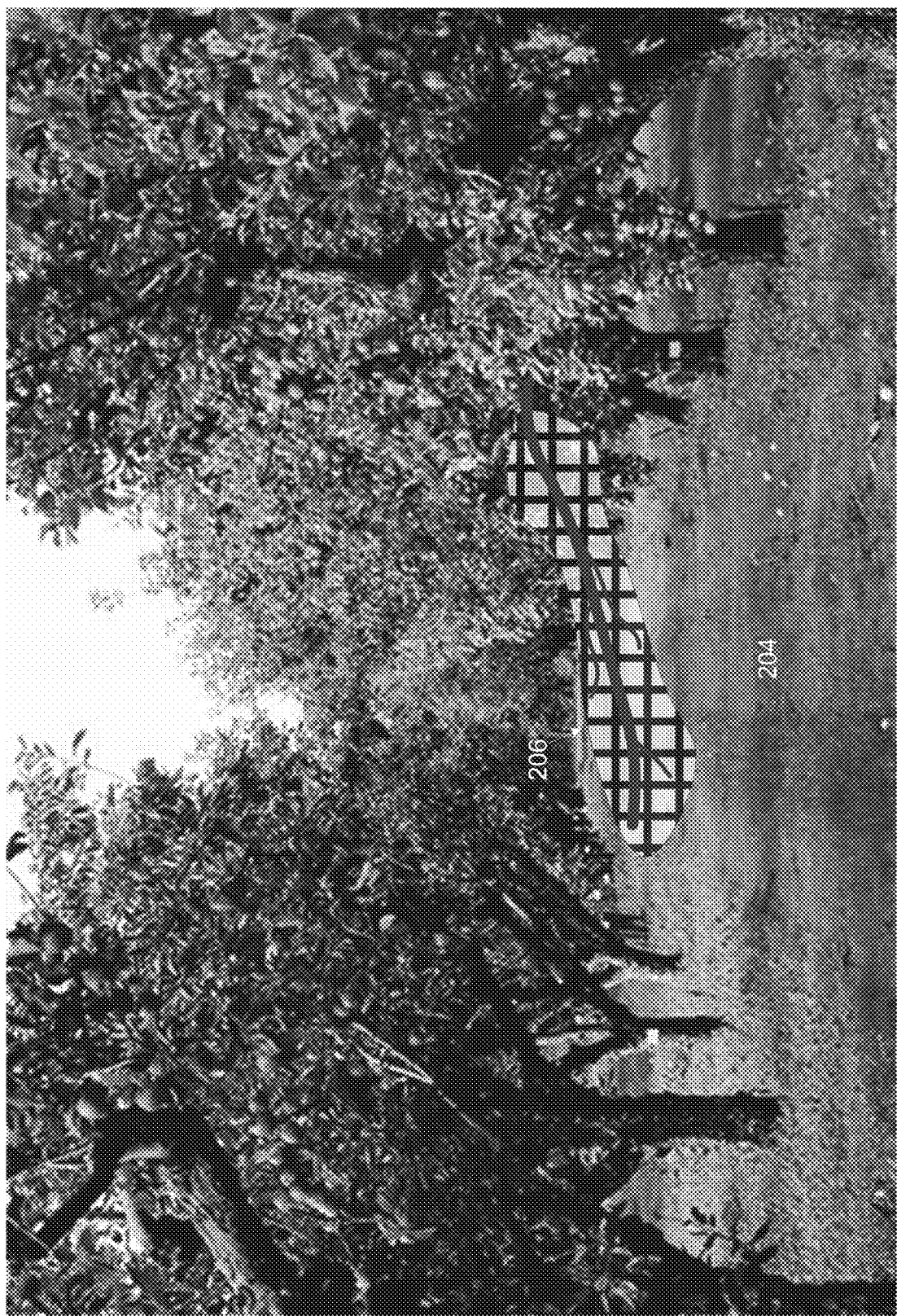

Reference is now made to FIG. 3A and FIG. 3B, which are schematic illustrations of exemplary vegetation obstacles blocking a path of an automated vehicle operated to move through the vegetation obstacles with minimal damage, according to some embodiments of the present invention.

As seen in FIG. 3A, an automate vehicle such as the automate vehicle 202 moving on a path such as the path 204 through a wooded area may encounter a branch 206 blocking the path 204 at least partially. As seen in FIG. 3B, the automate vehicle 202 moving on a path 204 through an orchard of crop producing plants, specifically fruit producing trees may encounter a branch 206 of one of the fruit trees which may block at least partially the path 204.

Reference is made once again to FIG. 2.

The path planning system 200 deployed in the automated vehicle 202 may include an Input/Output (I/O) interface 212 for communicating with one or more imaging sensors 208, a processor(s) 214 for executing the process 100 and a storage 216 for storing code (program store) and/or data.

The I/O interface 212 may include one or more wired and/or wireless interfaces, for example, a Universal Serial Bus (USB) interface, a serial interface, a Radio Frequency (RF) interface, a Bluetooth interface and/or the like for communicating with one or more of the imaging sensors 208. The I/O interface 212 may further include one or more network and/or communication interfaces for communicating with one or more network based imaging sensors 208.

The imaging sensor(s) 208, for example, a camera, a video camera, a thermal imaging camera, an Infrared sensor, a depth camera, a Laser Detection and Ranging (LiDAR) sensor, a Radio Detection and Ranging (RADAR) sensor, a Sound Navigation Ranging (SONAR) sensor and/or the like may be deployed in the automated vehicle 202, for example, mounted, attached, integrated and/or otherwise coupled to the automated vehicle 202. The imaging sensor(s) 208 may be deployed to monitor and capture sensory data, for example, images, video sequences, thermal maps, range maps and/or the like of the external environment of the automated vehicle. Specifically, one or more of the imaging sensor(s) 208 may be deployed to monitor and capture sensor data of the path 204 of the automated vehicle 202 such that the sensory data captured by the imaging sensor(s) 208 may depict one or more vegetation obstacles 206 potentially blocking the path 204 at least partially.

The processor(s) 214, homogenous or heterogeneous, may include one or more processors arranged for parallel processing, as clusters and/or as one or more multi core processor(s). The storage 216 may include one or more non-transitory persistent storage devices, for example, a Read Only Memory (ROM), a Flash array, a hard drive and/or the like. The storage 216 may also include one or more volatile devices, for example, a Random Access Memory (RAM) component, a cache memory and/or the like.

The processor(s) 214 may execute one or more software modules such as, for example, a process, a script, an application, an agent, a utility, a tool, an Operating System (OS) and/or the like each comprising a plurality of program instructions stored in a non-transitory medium (program store) such as the storage 216 and executed by one or more processors such as the processor(s) 214. The processor(s) 212 may optionally integrate, utilize and/or facilitate one or more hardware elements (modules) integrated, utilized and/or otherwise available in the path planning system 200, for example, a circuit, a component, an Integrated Circuit (IC), an Application Specific Integrated Circuit (ASIC), a Field Programmable Gate Array (FPGA), a Digital Signals Processor (DSP), a Graphical Processing Unit (GPU), an Artificial Intelligence (AI) accelerator and/or the like.

The processor(s) 240 may therefore execute one or more functional modules implemented using one or more software modules, one or more of the hardware modules and/or combination thereof, for example, a path planning engine 220 configured to execute the process 100.

The path planning system 200 may optionally include a network interface 218, comprising one or more wired and/or wireless interfaces for connecting to a network 210 comprising one or more wired and/or wireless networks, for example, a Local Area Network (LAN), a Wide Area Network (WAN), a Metropolitan Area Network (MAN), a Wireless LAN (WLAN), a cellular network, the internet and/or the like. Via the network interface 218, the path planning system 200 may communicate with more or more remote networked resources 230, for example, a server, a storage server, a database, a cloud service and/or platform and/or the like.

Optionally and typically, rather than deployed as an independent unit, the path planning system 200 may be utilized, implemented and/or integrated by one or more existing control and/or systems (e.g. Electronic Control Units (ECU), etc.) already deployed in the automated vehicle 202 for one or more other applications, for example, drive control, mission, control, data analysis and/or the like such that the path planning engine 220 is executed by the existing control unit(s).

Optionally, the path planning system 200, specifically the path planning engine 220 may be implemented by one or more of the remote resources 230, for example, a remote server, a remote computing node, a remote cluster of computing nodes and/or the like which may execute the path planning engine 220 executing the process 100. In such case, the path planning engine 220 may communicate with the automated vehicle 202 via the network 210 to receive the images of the path 204 and the blocking vegetation obstacle(s) 206 captured by the imaging sensor(s) 208 and to transmit back to the vehicle 202 the instructions for moving through the vegetation obstacle(s) 206. Moreover, the path planning system 200, specifically the path planning engine 220 may be implemented using one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Reference is made once again to FIG. 1.

As shown at 102, the process 100 starts with the path planning engine 220 receiving one or more images captured by one or more of the imaging sensor(s) 208 monitoring the path 204. In particular, the captured image(s) may depict the vegetation obstacle 206 which may at least partially block, interfere and/or obstruct the path 204 of the automated vehicle 202.

The term image and images as used herein, designates all sensory data types and products which may be captured by one or more of the imaging sensor(s) 208 which may vary depending on their technology and capture capabilities as well as products generated from the captured sensory data. The images may therefore include, for example, visual images, video sequences, ranging maps, thermal maps and/or the like.

As shown at 104, the path planning engine 220 may analyze the image(s) and extract one or more obstacle attributes of the vegetation obstacle 206, for example, a type, a size, a length, a width, a height, a weight, a flexibility, a position, location and/or orientation with respect to the path and/or the like.

The path planning engine 220 may analyze the sensory data, for example, the image(s) using one or more methods, techniques and/or algorithms as known in the art, for example, computer vision, image processing, classification functions and/or models (classifiers) and/or the like. I another example, assuming the sensor data includes ranging maps and/or the like, the path planning engine 220 may analyze the sensory data using one or more algorithms suitable for analyzing such sensory data as known in the art, for example, point-cloud analysis and/or reconstruction and/or the like.

For example, based on the analysis of the image(s) the path planning engine 220 may determine that the vegetation obstacle 206 is a tree branch, a bush, a bush branch, a crop plant and/or the like. The path planning engine 220 may further analyze the images to determine and extract one or more of the physical dimensions of the vegetation obstacle 206, for example, width, length, height and/or the like. In another example, the path planning engine 220 may determine and extract a position of the vegetation obstacle 206 with respect to the path 204, for example, an orientation, a portion of the path 204 blocked by the vegetation obstacle 206, a clearance space between the vegetation obstacle 206 and the path and/or the like.

However, the path planning engine 220 may estimate and extract one or more further obstacle attributes, for example, weight, flexibility and/or the like based on one or more of the visually extracted obstacle attributes. To this end, the path planning engine 220 may apply one or more estimation and/or prediction algorithms and/or models, for example, a classifier, a Machine Learning (ML) model, a Support Vector Machine (SVM) and/or the like trained to estimate one or more obstacle attributes of one or more vegetation obstacles 206 based on one or more other obstacle attributes of the vegetation obstacle 206, typically visually identifiable obstacle attributes.

For example, assuming that based on the analysis of the image(s), the path planning engine 220 determines that the vegetation obstacle 206 is a branch of a certain tree characterized by rigid branches. In such case, the path planning engine 220 may estimate that the vegetation obstacle 206 may be significantly rigid. In another example, assuming the path planning engine 220 determines, based on the analysis of the image(s), that the vegetation obstacle 206 is a branch of a tree characterized by highly flexible branches. In such case, the path planning engine 220 may estimate that the vegetation obstacle 206 may be significantly flexible. In another example the path planning engine 220 may estimate a weight of the vegetation obstacle 206 based on its type and further based on one or more of its physical dimensions, for example, size, width, length, height and/or the like.

As shown at 106, the path planning engine 220 may analyze a plurality of vehicle attributes of the automated vehicle 202.

The vehicle attributes of the automated vehicle 202 may include, for example, a type (e.g. ground vehicle, aerial vehicle, naval vehicle, etc.), a structure (e.g. a wheeled vehicle, a caterpillar based vehicle, etc.), a dimension (e.g., length, width, height, etc.), a speed range, a maneuverability and/or the like. The vehicle attributes may further include a description of one or more material of one or more parts, sections and/or segments of the automated vehicle 202 (e.g. plastic, metal, metal type, carbon, etc.), a location of one or more reinforced parts of the automated vehicle 202 (e.g. bumper, steel bar, metal covering, etc.), a location of one or more vulnerable parts, sections and/or elements of the automated vehicle 202 (e.g. glass windows, plastic parts, lamps, protruding extensions, sensitive equipment (sensors, etc.), etc.) and/or the like.

Optionally, the automated vehicle 202 may include one or more mechanical elements configured to clear one or more obstacles, in particular one or more vegetation obstacles such as the vegetation obstacle 206 and/or part thereof. The mechanical elements may include, for example, a mechanical arm which may be configured and/or operated to push aside at least part of the vegetation obstacle 206. In another example, the mechanical elements may include a cutting element, for example, a saw, a cutter and/or the like which may be configured and/or operated to cut away at least part of the vegetation obstacle 206. The vehicle attributes of automated vehicles 202 having one or more such mechanical elements may include and reflect the mechanical element(s) and/or its ability(s).

Information relating to the automated vehicles 202, the payloads 204 and their associated operational parameters may be stored in one or more records, for example, a file, a library, a structure, a database and/or the like which may be stored in one or more storages, for example, the storage 214, one or more of the remote networked resources 230, one or more attachable storage devices (e.g. USB stick, etc.) attached to the I/O interface 210 and/or a combination thereof.

The path planning engine 220 may obtain the vehicle attributes of the automated vehicle 202 may by accessing one or more records, for example, a file, a library, a structure, a database and/or the like associating the automated vehicle 202 with its vehicle attributes which may be stored in one or more storage locations, for example, the storage 216, one or more of the remote resources 230, one or more attachable storage devices (e.g. USB stick, etc.) and/or a combination thereof.

As shown at 108, the path planning engine 220 may compute a plurality of movement patterns for operating the automated vehicle 202 to cross the vegetation obstacle 206. Specifically, the movement patterns computed by the path planning engine 220 are directed to operate the automated vehicle 202 to cross the vegetation obstacle 206 by moving through the vegetation obstacle 206 rather than moving around (bypassing) it.

The automated vehicle 202 crossing of the vegetation obstacle 206, in particular moving through the vegetation obstacle 206 may therefore comprise one or more actions and/or operations, for example, bending at least part of the vegetation obstacle 206, breaking at least part of the vegetation obstacle 206, cutting at least part of the vegetation obstacle 206 and/or the like.

The path planning engine 220 may compute the movement patterns based on one or more of the plurality of vehicle attributes of the automated vehicle 202 with respect to one or more of the plurality of obstacle attributes of the vegetation obstacle 206. Each of the movement patterns may define one or more of a plurality of movement parameters of the automated vehicle 202 operated to cross through the vegetation obstacle 206. The movement parameters may include, for example, a movement direction, an approach path, an approach angle, a contact point, a vehicle orientation, a speed, an acceleration and/or the like.

For example, assuming that, based on analysis of the obstacle attributes of a certain vegetation obstacle 206 blocking the path 204 of a certain ground automated vehicle 202, the path planning engine 220 identifies and/or determines that a certain section of the certain vegetation obstacle 206 is higher from the ground compared to other sections and/or parts of the certain vegetation obstacle 206 thus providing more clearance above ground. In such case, the path planning engine 220 may generate a movement pattern defining a certain access path, access point and/or access angle for the certain ground automated vehicle 202 to approach the certain vegetation obstacle 206 such that the certain ground automated vehicle 202 may contact the certain vegetation obstacle 206 at the higher certain section which the certain ground automated vehicle 202 is estimated to be able to move through and optionally to more easily and/or efficiently move though in order to cress the certain vegetation obstacle 206.

In another example, assuming that, based on analysis of the obstacle attributes of a certain vegetation obstacle 206 blocking the path 204 of a certain ground automated vehicle 202, the path planning engine 220 identifies and/or determines that a certain part of section of the certain vegetation obstacle 206 is more flexible than other sections and/or parts of the certain vegetation obstacle 206. In such case, the path planning engine 220 may generate a movement pattern defining a certain speed and/or acceleration, for example, a significantly low fixed speed with no acceleration for the certain ground automated vehicle 202 to contact the certain vegetation obstacle 206 at the flexible certain section which the certain ground automated vehicle 202 in order to move through the certain vegetation obstacle 206.

In another example, assuming that, based on analysis of the obstacle attributes of a certain vegetation obstacle 206 blocking the path 204 of a certain automated vehicle 202, the path planning engine 220 identifies and/or determines that the certain vegetation obstacle 206 is positioned on the path 204 in a certain position which the path planning engine 220 estimates could be best bent when accessed from a certain direction. In such case, the path planning engine 220 may the path planning engine 220 may generate one or more movement patterns defining the certain direction for the certain automated vehicle 202 to access and contact the certain vegetation obstacle 206 in order to most efficiently move through it.

In another example, assuming that, based on analysis of the vehicle attributes of a certain ground automated vehicle 202 whose path 204 is blocked by a certain vegetation obstacle 206, the path planning engine 220 identifies and/or determines that a certain part and/or section of the certain ground automated vehicle 202, for example, a rear side, is enforced and hence more rigid, durable, damage resistant and/or the like. In such case, the path planning engine 220 may generate a movement pattern defining that a certain orientation and/or driving direction of the certain ground automated vehicle 202, for example, driving in reverse with the respect to the certain vegetation obstacle 206 such that the enforced rear side comes in contact with the certain vegetation obstacle 206 in order to move through it.

In another example, assuming that, based on analysis of the obstacle attributes of a certain vegetation obstacle 206 blocking the path 204 of a certain automated vehicle 202, the path planning engine 220 identifies and/or determines that the certain vegetation obstacle 206 is highly rigid which thus not easily moved through. Further assuming that, based on analysis of the vehicle attributes of the certain automated vehicle 202, the path planning engine 220 identifies and/or determines that the certain automated vehicle 202 has one or more mechanical elements, for example, a cutting element such as, for example, a saw which is capable of sawing at least part of the certain vegetation obstacle 206. In such case, the path planning engine 220 may the path planning engine 220 may generate a movement pattern defining a certain section of the certain vegetation obstacle 206 to be cut by the saw of the certain automated vehicle 202 in order to move through the certain vegetation obstacle 206.

The movement parameters may further include one or more parameters which may depend on the type of the automated vehicle. For example, the movement parameters may include an altitude for an aerial automated vehicle 202. For example, assuming the path 204 of a certain aerial automated vehicle 202, for example, a drone is blocked by a certain vegetation obstacle 206, for example, a tree branch estimated by the path planning engine 220 to have a highly flexible section at a certain height above the ground. In such case, the path planning engine 220 may compute one or more movement patterns for the drone which define an altitude in which the drone may contact the flexible section of the tree branch which is estimated to bend thus enabling the drone to move through the tree branch vegetation obstacle 206. In another example, assuming the path 204 of a certain naval automated vehicle 202, for example, a submarine is blocked by a certain vegetation obstacle 206, for example, a water plant estimated by the path planning engine 220 to be highly flexible at a certain depth below the water. In such case, the path planning engine 220 may compute one or more movement patterns for the submarine which define a depth in which the submarine should move through the flexible part of the water plant vegetation obstacle 206 to cross it.

Optionally, the path planning engine 220 may adjust one or more of the movement patterns according to analysis of one or more additional images depicting one or more additional vegetation obstacles such as the vegetation obstacle 206 which at least partially block the path 204 further ahead beyond the vegetation obstacle 206. This means that in addition to the vegetation obstacle 206 currently encountered by the automated vehicle 202 in the path 204, one or more additional vegetation obstacles 206 may block the path 204 at least partially further ahead.

One or more of the additional image(s) depicting the additional vegetation obstacle(s) 206 blocking the path 204 further ahead may be captured by one or more of the imaging sensors 220 deployed in the automated vehicle 202 which may be configured, adapted and/or operated to capture images of areas further ahead of the automated vehicle. Such imaging sensors 220 may include, for example, long range, high zoom and/or high resolution imaging sensors. In another example, one or more of the additional image(s) may be received from one or more imaging sensors such as the imaging sensor 220 which are not deployed in the automated vehicle 202, for example, an imaging sensor mounted on a pole overlooking the path 204, am imaging sensor mounted on a drone flying over the path 204 and/or the like.

The path planning engine 220 may analyze the additional image(s) to extract one or more obstacle attributes of the additional vegetation obstacle(s) 206. The path planning engine 220 may then adjust one or more of the movement patterns based on one or more of the obstacle attributes of the additional vegetation obstacle(s) 206, specifically with respect to one or more of the vehicle attributes of the automated vehicle 202.

For example, assuming that one or more of the movement patterns initially computed by the path planning engine 222 for operating a certain automated vehicle 202 to move through a certain vegetation obstacle 206 blocking the path 204 of the certain automated vehicle 202 defines one or more certain movement parameters, for example, moving forward in a certain direction such that a relatively not enforced front section of the certain automated vehicle 202 bends a flexible part of the certain vegetation obstacle 206. Further assuming that based on analysis of one or more additional images depicting another (additional) vegetation obstacle 206 blocking the path 204 further ahead, path planning engine 222 determines that the other vegetation obstacle 206 is highly rigid which may cause major damage to the front section of the certain automated vehicle 202 if the certain automated vehicle 202 is operated to engage with the other vegetation obstacle 206 with the front section. However, the path planning engine 222 may estimate and/or determine that a rear section of the certain automated vehicle 202 which is highly enforced may be able to break the rigid other vegetation obstacle 206.

Since the path planning engine 222 estimates that the other further ahead vegetation obstacle 206 may be crossed by breaking it with the enforced rear section of the certain automated vehicle 202, the path planning engine 222 may adjust one or more of the initially computed movement patterns to define adjusted movement parameters. For example, the path planning engine 222 may adjust the orientation movement parameter to define moving backward (in reverse gear) in the certain direction such that the enforced rear section of the certain automated vehicle 202 bends the certain vegetation obstacle 206. This means that rather than risking damage to both the front and rear sections of the certain automated vehicle 202 as may result from the initially computed movement pattern(s), according to the adjusted movement pattern(s) only the rear section of the certain automated vehicle 202 may be damages thus significantly reducing the potential damage to the certain automated vehicle 202 and hence the damage cost.

As shown at 110, the path planning engine 220 may compute, for example, estimate, predict and/or the like a cost of damage to the automated vehicle 202 and/or to the vegetation obstacle 206 for each of the plurality of movement patterns, i.e. when the automated vehicle 202 is operated to move through the vegetation obstacle 206 according to the respective movement pattern.

The damage may be inflicted to the automated vehicle 202 and/or to the vegetation obstacle 206 as result of the contact, pressure, force and/or the like applied between the automated vehicle 202 and the vegetation obstacle 206 while the automated vehicle 202 is operated to cross the vegetation obstacle 206 by moving through it which may include, bending, breaking and/or cutting at least part of the vegetation obstacle 206.

For example, assuming one or more of the movement patterns are computed for a certain automated vehicle 202 operated to execute an agricultural operation by moving in a path 204 in an agricultural area which is blocked by one or more vegetation obstacles 206 which are formed by one or more crop producing plants. For example, assuming one or more movement patterns are computed by the path planning engine 220 for a picking machine automated vehicle 202 to cross through a certain vegetation obstacle 206, for example, a fruit tree branch blocking a path 204 of the automated vehicle 202 in an orchard. Further assuming that the movement pattern(s) defines bending at least part of the blocking tree branch. The path planning engine 220 may estimate that as result of the contact and mutual pressure between the picking machine and the blocking tree branch, the picking machine may suffer damage, for example, one or more parts of the picking machine may be bent, scratched and/or otherwise damaged. The path planning engine 220 may further estimate a cost of the damage to the picking machine. Moreover, the path planning engine 220 may estimate that as result of the contact and mutual pressure between the picking machine and the blocking tree branch, damage may be inflicted to the blocking tree branch and or to the fruit tree itself, for example, fruit may be dropped and lost. The path planning engine 220 may further estimate a cost of the damage to the fruit tree, for example, in terms of the cost of lost fruit. The overall damage computed by the path planning engine 220 in this case may therefore include both the damage to the automated picking machine and the damage to the fruit tree from which the blocking branch extends.

Optionally, the cost of damage computed by the path planning engine 220 may further includes cost of additional and/or recurring damage to the automated vehicle 202 operated to cross the vegetation obstacle 206 multiple times during the mission since additional damage may result during one or more of the additional crossings. For example, assuming that a certain automated vehicle 202, for example, an automated spraying machine is expected to move in a certain path 204 through a certain agricultural area, for example, an orchard multiple times during a spraying mission and thus cross multiple times a location of a certain vegetation obstacle 206, for example, a tree branch blocking the certain path 204. Further assuming that one or more movement patterns computed by the path planning engine 220 for the automated spraying machine to cross the blocking tree branch define bending at least part of the blocking tree branch. In such case, the path planning engine 220 may estimate that during each cross of the blocking tree branch the spraying machine may suffer additional and/or recurring damage, for example, increased bending, scratching and/or the like which may increase the damage to the spraying machine and may thus increase the cost of the damage to the spraying machine. The path planning engine 220 may therefore adjust the cost of damage accordingly to include the additional and/or damage to the spraying machine.

Moreover, the cost of damage computed by the path planning engine 220 may also include cost of damage to one or more other vehicles, automated or not (i.e. manually operated) operated to cross the vegetation obstacle 206 in the future following the current crossing of the vegetation obstacle 206 by the automated vehicle 202. The cost of damage to the other vehicles may further include a cost of recurring damage to one or more of the other vehicles operated in the future to cross the vegetation obstacle 206. For example, assuming that two automated vehicles 202, for example, first an automated plower followed by a seed dispenser (automated or manually operated) are planned to move in a certain path 204 through a certain geographical area, for example, a wheat field which is blocked by a certain vegetation obstacle 206, for example, a tree branch of a tree located at the perimeter of the wheat field. Further assuming that one or more movement patterns computed by the path planning engine 220 for the automated plower and the seed dispenser to cross the blocking tree branch define bending at least part of the blocking tree branch. In such case, the path planning engine 220 may estimate that during the cross of the blocking tree branch each of the automated plower and the seed dispenser may suffer damage. The path planning engine 220 may therefore adjust the cost of damage accordingly to include the damage to both the automated plower and the seed dispenser.

Furthermore, assuming that one or more of the other vehicles (automated or manually operated) are planned to move through the path 204 multiple times following the crossing of the automated vehicle 202, thus moving through the vegetation obstacle 206 multiple times, the path planning engine 220 may estimate that the other vehicle(s) may suffer additional and/or recurring damage. The path planning engine 220 may therefore adjust the cost of damage to include the cost of the additional and/or recurring damage to the other vehicle(s) operated to cross the vegetation obstacle 206 multiple times.

Optionally, the path planning engine 220 may be configured to predict and/or estimate a number and/or type of vehicles (automated or manually operated) estimated to cross the vegetation obstacle 206 following the crossing of the vegetation obstacle 206 by the automated vehicle 202 and adjust the cost of damage accordingly. The path planning engine 220 may be configured to predict the number and type of vehicles that may cross the vegetation obstacle 206 during a certain future time period, for example, a month, a year, 3 years, the estimated life time of the vegetation obstacle 206 in case it is a crop producing plant and/or the like. In particular, the path planning engine 220 may compute the damage to each vehicle planned to cross the vegetation obstacle 206 according to one or more vehicle attributes of each of the vehicles predicted to cross the vegetation obstacle 206. Moreover, the path planning engine 220 may compute one or more movement patterns for each of the vehicles predicted to cross the vegetation obstacle 206 and may compute accordingly, as described herein before, the damage and the cost of damage to these vehicle(s).

Optionally, the path planning engine 220 may compute the cost of damage to include a cost of long term damage to vegetation infrastructure of the vegetation obstacle 206, in particular when the vegetation is obstacle 206 at least part of a crop producing plant where the long term damage may include loss of future crop thus the cost of the long term damage may relate to the cost of the lost future crop (e.g. fruits, vegetables, herbs, flowers, etc.).

For example, assuming that a certain automated vehicle 202 is operated to move in a certain path 204 through a certain agricultural area, for example, an orchard where a certain vegetation obstacle 206, for example, a fruit tree branch may block the certain path 204. Further assuming that one or more movement patterns computed by the path planning engine 220 for the certain automated vehicle 202 to move through the blocking fruit tree branch define breaking and/or cutting at least part of the blocking fruit tree branch. In such case, the path planning engine 220 may estimate the volume, number and/or any other measurement metrics of lost fruit that would have otherwise grown in the future (optionally during multiple growth cycles) on the damaged, broken and/or cut segment of the blocking fruit tree branch and/or on the fruit tree itself, if damaged, as result of the breaking and/or cutting operation. The path planning engine 220 may further estimate and/or predict the cost of the long term lost fruit (crop) and may adjust the cost of damage accordingly.

The path planning engine 220 may apply one or more methods, techniques and/or algorithms to estimate, predict and/or compute the damage to the automated vehicle 202 and/or to the vegetation obstacle 206 formed by a fruit producing plant. For example, the path planning engine 220 may apply one or more trained Machine Learning (ML) models, for example, a classifier, a neural network, a Support Vector Machine (SVM) and/or the like to estimate and/or predict the damage to the automated vehicle 202 and/or to the vegetation obstacle 206.

The ML model(s) may be trained using training samples describing damage effects to one or more vehicles (automated and/or manually operated) resulting from encounter, contact, interaction, pressure and/or the like with one or more vegetation obstacles which may be simulated, extracted from real-life incident of interaction between vehicles and vegetation and/or generated by experts. Moreover, the training samples used to train the ML model(s) may further describe the damage to a plurality of vehicles and a plurality of vegetation samples with respect to a plurality of the movement parameters applied by the vehicles to move through the vegetation. As such, the ML model(s) may be highly trained, adapted and efficient for estimating the damage to the automated vehicles 202 and/or to the vegetation obstacles 206 when operated according to one or more of the plurality of movement patterns each defining one or more of the movement parameters for operating the automated vehicle to move through the vegetation obstacles 206.

The ML model(s) may be further trained and used to estimate, predict and/or compute the cost of damage based on the damage predicted for the automated vehicle 202 and/or to the vegetation obstacle 206. To this end, the ML model(s) may be trained using training samples describing a plurality of damage effects and their associated damage, either one cost of one-time damage during the crossing of the vegetation obstacle 206 by the automated vehicle 202, additional and/or recurring damage to the automated vehicle 202 and/or to one or more other vehicles planned and/or predicted to cross the vegetation obstacle 206 following the automated vehicle 202, long term damage due to lost crop and/or the like. The ML model(s) may be therefore capable of accurately and reliably estimating with high precision the cost of damage that may incur due to the movement of the automated vehicle 202 and optionally one or more other vehicles through the vegetation obstacles 206.

Optionally weights may be assigned to one or more of the damage types, for example, the immediate damage, the long term damage to the vegetation obstacle specifically in case of crop producing plant(s), the recurring damage to the automated vehicle 202, the damage to the additional vehicles and/or the like. For example, assuming the automated vehicle 202 is a high cost, high value and/or high importance (e.g. there are few or even only a single such vehicle) vehicle, higher weights may be assigned to immediate damage while smaller weights may be assigned to the long term and/or recurring damage. In contrast, assuming the automated vehicle 202 is a robust and/or easily reparable vehicle, lower weights may be assigned to immediate damage while higher weights may be assigned to the long term and/or to the damage to other vehicles.

The ML model(s) trained using real-life and/or simulated scenarios of automated vehicles crossing through vegetation obstacles and the resulting damage may therefore learn, evolve and/or adapt accordingly, for example, adjust their internal propagation paths weights to apply weighted values to the different damage types and damage costs to accurately and/or reliably compute a predicted overall cost of damage.

As shown at 112, the path planning engine 220 may select one of the movement patterns for operating the automated vehicle to cross the vegetation obstacle 206 by moving through the vegetation obstacle 206, specifically the path planning engine 220 may select one of the movement patterns which reduces the cost of damage, i.e. a selected movement pattern which may minimize the cost of damage.

The path planning engine 220 may apply one or more selection rules, schemes, methods, and/or criteria (designated selection rules herein after) for selecting the movement pattern estimated to reduce the cost of damage to a lowest value (level) among the plurality of movement patterns. The selection rules may include one or more predefined rules and/or one or more dynamically adjusted rules which may be crafted, adjusted, updated and/or altered in real-time during the mission.

For example, a first selection rule may define reducing only the cost of damage to the automated vehicle 202 while ignoring the cost of damage to the vegetation obstacle 206, for example, in case of high cost and/or sensitive automated vehicles 202 which may be easily damaged and may be costly to repair or replace and/or in case of vegetation obstacles 206 formed by crop producing plant producing low-cost crop which may therefore apply only insignificant cost. Applying the first selection rule, the path planning engine 220 may select a movement path defining one or more movement parameters which may reduce and/or prevent damage to the automated vehicle 202 while possibly inflicting major damage to the vegetation obstacle 206, for example, cutting off at least part of the vegetation obstacle 206 to enable undisturbed movement of the automated vehicle 202 through the vegetation obstacle 206. In contrast, a second selection rule may define reducing only the cost of damage to the vegetation obstacle 206 while ignoring the cost of damage to the automated vehicle 202, for example, in case of low cost and/or robust and damage immune automated vehicles 202 and/or in case of vegetation obstacles 206 formed by crop producing plant producing high cost crop and/or long term multiple crop cycles. Applying the second selection rule, the path planning engine 220 may select a movement path defining one or more movement parameters which may increase damage to the automated vehicle 202 while reducing and potentially preventing damage to the vegetation obstacle 206, for example, bending the vegetation obstacle 206.

In another example, a certain selection rule may define reducing the cost of only immediate damage to the automated vehicle 202 and/or to the vegetation obstacle 206 during the current crossing of the vegetation obstacle 206 while ignoring recurring, additional and/or long term damage to the automated vehicle 202, to other vehicles and/or to the vegetation obstacle 206. In contrast, another selection rule may be define reducing the cost of overall damage including immediate damage to the automated vehicle 202 and/or to the vegetation obstacle 206, recurring damage to the to the automated vehicle 202, additional damage to other vehicles and the long term damage to the vegetation obstacle 206.

As shown at 114, the path planning engine 220 may output instructions for operating the automated vehicle 202 according to the selected movement pattern. The path planning engine 220 may output the instructions using one or more ways, methods and/or channels based on the deployment configuration, communication capabilities, programming modes and/or the like of the automated vehicles 202. For example, in case the path planning system 200 is deployed in the automated vehicle 202 either as an independent unit and/or as part one or more other systems and/or units of the automated vehicle 202, the path planning engine 220 may communicate with one or more control units of the vehicle which are configured to control and maneuver the automated vehicle. In another example, in case the path planning engine 220 is executed by one or more of the remote resources 230, the path planning engine 220 may transmit the instructions to the automated vehicle 202 via the network 210.

Optionally, the path planning engine 220 may adjust one or more movement parameters defined by the selected movement pattern in real-time while the automated vehicle 202 moves through the vegetation obstacle 206. The path planning engine 220 may adjust the movement parameter(s) based on analysis of sensory data captured by one or more sensors deployed in the automated vehicle 202 to monitor interaction, for example, contact, pressure, force and/or the like between the automated vehicle 202 and the vegetation obstacle 206.

The sensor(s) configured to monitor the interaction may include one or more of the imaging sensor(s) 220 deployed in the automated vehicle 202 which may capture one or more images of the environment of the automated vehicle 202, specifically of the vegetation obstacle 206 in real-time while the automated vehicle 202 interacts, engages, contacts and/ or the like with the vegetation obstacle 206 to move through it. The path planning engine 220 may analyze the captured image(s) to estimate, evaluate and/or determine potential damage to the automated vehicle 202 and/or to the vegetation obstacle 206.

The sensor(s) configured to monitor the interaction between the automated vehicle 202 and the vegetation obstacle 206 may further include one or more other sensors deployed in the automated vehicle 202, for example, a pressure sensor, a proximity sensor, a tactile sensor and/or the like. Such sensors may monitor and measure sensory data such as, for example, a distance between the automated vehicle 202 and the vegetation obstacle 206, a pressure applied at one or more locations of the automated vehicle 202 and/or the like. The path planning engine 220 may analyze the captured interaction parameters to estimate, evaluate and/or determine potential damage to the automated vehicle 202 and/or to the vegetation obstacle 206.

Based on the evaluated damage determined based on the analysis of the sensory data, the path planning engine 220 may adjust one or more of the movement parameters of the movement pattern used to operate the automated vehicle 202 in order to prevent, reduce and/or minimize the damage automated vehicle 202 and/or to the vegetation obstacle 206 which may potentially reduce the damage cost.

For example, assuming that a certain automated vehicle 202 is operated according to one or more movement parameters, for example, a certain access angle at a certain speed defined by a certain movement pattern selected for operating the certain automated vehicle 202 to move through a certain vegetation obstacle 206. Further assuming that while the certain automated vehicle 202 engages, interacts and contacts the certain vegetation obstacle 206, the path planning engine 222 determines and/or estimates, based on sensory data captured by one or more of the sensor(s) deployed in the certain automated vehicle 202, that a certain element of the certain automated vehicle 202 is under extreme pressure. In such case, the path planning engine 222 may adjust one or more of the movement parameters, for example, change the access angle, change the movement direction, reduce the speed and/or the like to reduce the pressure from certain element thus reducing and/or preventing damage to it.

In another example, assuming that a certain automated vehicle 202 is operated to move through a certain vegetation obstacle 206, for example, a tree branch according to certain selected movement pattern computed based on analysis of images of the tree branch. Further assuming that while the certain automated vehicle 202 moves through the tree branch, based on sensory data captured by one or more of the sensor(s) deployed in the certain automated vehicle 202, the path planning engine 222 determines that the movement does not follow the estimated movement. For example, the movement may be too slow, for example, since the tree branch may be heavier than estimated based on the images of the tree branch previously captured by the imaging sensors 208. In another example, the movement may be faster than expected, for example, since the tree branch may be rotten and may break where the rotting condition was not identified in the analysis of the images previously captured by the imaging sensors 208. In such case, the path planning engine 222 may adjust one or more of the movement parameters, for example, change the movement direction of the certain automated vehicle 202 and/or its speed according to the newly determined information relating to the tree branch.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms automated vehicle and imaging sensor technologies are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of automatically operating automated vehicles moving through vegetation obstacles with minimal damage, comprising:
    using at least one processor for:
        receiving at least one image depicting at least one vegetation obstacle blocking at least partially a path of an automated vehicle executing a mission;
        analyzing the at least one image to extract at least one of a plurality of obstacle attributes of the at least one vegetation obstacle;
        computing a plurality of movement patterns for operating the automated vehicle to cross the at least one vegetation obstacle based on at least one of a plurality of vehicle attributes of the automated vehicle with respect to at least one of the plurality of obstacle attributes, each of the plurality of movement patterns defining at least one of a plurality of movement parameters of the automated vehicle, at least one of the computed movement patterns comprising engaging the vegetation obstacle with at least one mechanical element of the automated vehicle, for clearing a way for the automated vehicle to cross;
        selecting one of the plurality of movement patterns estimated to reduce a cost of damage to the automated vehicle and/or to the at least one vegetation obstacle;
        outputting instructions for operating the automated vehicle to move through the at least one vegetation obstacle according to the selected movement pattern; and
        in real-time, during a time period when the automated vehicle is moving through the at least one vegetation obstacle according to the selected movement pattern, capturing sensory data by at least one sensor deployed to monitor interaction between the automated vehicle and the at least one vegetation obstacle during said time period during which the automated vehicle is moving through the at least one vegetation obstacle and adjusting at least one of the plurality of movement parameters defined by the selected movement pattern according to the captured sensory data.

2. The method of claim 1, wherein the automated vehicle is a member of a group consisting of: a ground vehicle, an aerial vehicle, and a naval vehicle.

3. The method of claim 1, wherein crossing the at least one vegetation obstacle comprises: bending at least part of the at least one vegetation obstacle, breaking at least part of the at least one vegetation obstacle, and cutting at least part of the at least one vegetation obstacle.

4. The method of claim 1, wherein each of the plurality of obstacle attributes is a member of a group consisting of: a type, a size, a length, a width, a height, a weight, a flexibility, and a position with respect to the path.

5. The method of claim 1, wherein each of the plurality of vehicle attributes is a member of a group consisting of: a vehicle type, a vehicle structure, a speed range, a maneuverability, a material of at least one part of the automated vehicle, a location of at least one reinforced part of the automated vehicle, and a location of at least one vulnerable part of the automated vehicle.

6. The method of claim 1, wherein each of the plurality of movement parameters is a member of a group consisting of: a movement direction, an approach path, an approach angle, a contact point, a vehicle orientation, a speed, an acceleration and an altitude.

7. The method of claim 1, further comprising at least one of the plurality of movement patterns includes using at least one mechanical element of the automated vehicle to clear the at least one vegetation obstacle and/or part thereof, the at least one mechanical element comprising at least one member of a group consisting of: a mechanical arm, and a cutting element.

8. The method of claim 1, wherein the mission comprises at least one agricultural operation and the at least one vegetation obstacle is formed by at least one crop producing plant.

9. The method of claim 1, wherein the cost of damage further comprises a cost of damage to at least one another vehicle operated to cross the at least one vegetation obstacle following the automated vehicle.

10. The method of claim 1, wherein the cost of damage further comprises a cost of recurring damage to at least one vehicle operated to cross the at least one vegetation obstacle multiple times during the mission.

11. The method of claim 1, wherein the cost of damage further comprises a cost of recurring damage to at least one vehicle operated to cross the at least one vegetation obstacle in a plurality of future missions.

12. The method of claim 1, further comprising:
    predicting a number and/or type of vehicles estimated to cross the at least one vegetation obstacle, and
    adjusting the cost of damage according to at least one vehicle attributes of the vehicles predicted to cross the at least one vegetation obstacle.

13. The method of claim 1, wherein the cost of damage further comprises a cost of long term damage to vegetation infrastructure of the at least one vegetation obstacle, the long term damage includes loss of future crop.

14. The method of claim 1, wherein the cost of damage is computed using at least one trained machine learning (ML) model configured to:
    estimate a damage to the automated vehicle and/or to the at least one vegetation obstacle based on analysis of the at least one vehicle attribute of the automated vehicle with respect to the plurality of obstacle attributes, and estimate a cost of the estimated damage.

15. The method of claim 1, further comprising adjusting at least one of the plurality of movement patterns according to analysis of at least one additional image depicting at least one additional vegetation obstacle at least partially blocking the path of the automated vehicle further down the path beyond the at least one vegetation obstacle.

16. A system for automatically operating automated vehicles moving through vegetation obstacles with minimal damage, comprising:
  at least one processor configured to execute a code, the code comprising:
    code instructions to receive at least one image depicting at least one vegetation obstacle blocking at least partially a path of an automated vehicle executing a mission;
    code instructions to analyze the at least one image to extract at least one of a plurality of obstacle attributes of the at least one vegetation obstacle;
    code instructions to compute a plurality of movement patterns for operating the automated to cross the at least one vegetation obstacle based on at least one of a plurality of vehicle attributes of the automated vehicle with respect to at least one of the plurality of obstacle attributes, each of the plurality of movement patterns defining at least one of a plurality of movement parameters of the automated vehicle, at least one of the computed movement patterns comprising engaging the vegetation obstacle with at least one mechanical element of the automated vehicle, for clearing a way for the automated vehicle to cross;
    code instructions to select one of the plurality of movement patterns estimated to reduce a cost of damage to the automated vehicle and/or to the at least one vegetation obstacle;
    code instructions to output instructions for operating the automated vehicle to move through the at least one vegetation obstacle according to the selected movement pattern; and
    code instructions to capture sensory data during a time period when the automated vehicle is moving through the at least one vegetation obstacle, by at least one sensor deployed to monitor interaction between the automated vehicle and the at least one vegetation obstacle during said time period during which the automated vehicle is moving through the at least one vegetation obstacle and to adjust at least one of the plurality of movement parameters defined by the selected movement pattern according to the captured sensory data.

17. A computer program product for automatically operating automated vehicles moving through vegetation obstacles with minimal damage, comprising: at least one computer readable storage media having thereon:
  first program instructions executable by at least one processor to cause the at least one processor to receive at least one image depicting at least one vegetation obstacle blocking at least partially a path of an automated vehicle executing a mission;
  second program instructions executable by the at least one processor to cause the at least one processor to analyze the at least one image to extract at least one of a plurality of obstacle attributes of the at least one vegetation obstacle;
  third program instructions executable by the at least one processor to cause the at least one processor to compute a plurality of movement patterns for operating the automated to cross the at least one vegetation obstacle based on at least one of a plurality of vehicle attributes of the automated vehicle with respect to at least one of the plurality of obstacle attributes, each of the plurality of movement patterns defines at least one of a plurality of movement parameters of the automated vehicle and at least one of the computed movement patterns comprising engaging the vegetation obstacle with at least one mechanical element of the automated vehicle, for clearing a way for the automated vehicle to cross;
  fourth program instructions executable by the at least one processor to cause the at least one processor to select one of the plurality of movement patterns estimated to reduce a cost of damage to the automated vehicle and/or to the at least one vegetation obstacle;
  fifth program instructions executable by the at least one processor to cause the at least one processor to output instructions for operating the automated vehicle to move through the at least one vegetation obstacle according to the selected movement pattern; and
  sixth program instructions executable by the at least one processor to cause the at least one processor to capture sensory data during a time period when the automated vehicle is moving through the at least one vegetation obstacle, by at least one sensor deployed to monitor interaction between the automated vehicle and the at least one vegetation obstacle during said time period during which the automated vehicle is moving through the at least one vegetation obstacle and to adjust at least one of the plurality of movement parameters defined by the selected movement pattern according to the captured sensory data.

* * * * *